(12) United States Patent
Torres-Morales et al.

(10) Patent No.: US 12,056,671 B2
(45) Date of Patent: Aug. 6, 2024

(54) METHOD FOR CALCULATING A MAINTENANCE ASSET HEALTH INDEX (MAHI) FOR INDUSTRIAL EQUIPMENT

(71) Applicant: VisualK, Bayamon, PR (US)

(72) Inventors: Angel M. Torres-Morales, Guaynabo, PR (US); Luis A. Echevarria Sotomayor, Guaynabo, PR (US); Saul Soto, Dorado, PR (US)

(*) Notice: Subject to any disclaimer, the term of this patent is extended or adjusted under 35 U.S.C. 154(b) by 403 days.

(21) Appl. No.: 17/563,668

(22) Filed: Dec. 28, 2021

(65) Prior Publication Data
US 2022/0215352 A1 Jul. 7, 2022

Related U.S. Application Data

(60) Provisional application No. 63/131,633, filed on Dec. 29, 2020.

(51) Int. Cl.
*G06Q 10/00* (2023.01)
*G06Q 10/08* (2024.01)
*G06Q 10/0875* (2023.01)
*G06Q 10/20* (2023.01)

(52) U.S. Cl.
CPC ......... *G06Q 10/20* (2013.01); *G06Q 10/0875* (2013.01)

(58) Field of Classification Search
CPC . G06Q 10/20; G06Q 10/0875; G06Q 10/0635
See application file for complete search history.

(56) References Cited

U.S. PATENT DOCUMENTS

| | | | | |
|---|---|---|---|---|
| 6,049,742 A * | 4/2000 | Milne | ............... | G06Q 10/06 705/28 |
| 8,170,893 B1 * | 5/2012 | Rossi | ............... | G06Q 10/063 705/7.11 |
| 8,560,366 B2 * | 10/2013 | Mikurak | ........... | G06Q 30/0202 705/7.12 |
| 8,781,882 B1 * | 7/2014 | Arboletti | ........... | G06Q 10/0639 705/7.41 |
| 9,922,345 B2 * | 3/2018 | Mikurak | ........... | G06Q 30/0261 |
| 10,732,621 B2 * | 8/2020 | Cella | ............... | H04L 67/1097 |
| 10,757,000 B2 * | 8/2020 | Gelvin | ............... | H01Q 9/0464 |
| 10,964,130 B1 * | 3/2021 | Dixit | ............... | G05B 23/0283 |
| 11,055,450 B2 * | 7/2021 | Zyglowicz | ........... | G06Q 10/067 |
| 11,797,550 B2 * | 10/2023 | Boven | ............... | G06F 16/212 |
| 2008/0133300 A1 * | 6/2008 | Jalinous | ............ | G06Q 10/0637 705/7.29 |
| 2010/0017241 A1 * | 1/2010 | Lienhardt | ............ | G06Q 10/00 702/184 |
| 2012/0221371 A1 * | 8/2012 | Hegazy | ............... | G06Q 50/16 705/7.25 |
| 2014/0330749 A1 * | 11/2014 | Candas | ............... | G06Q 40/06 705/36 R |
| 2015/0073862 A1 * | 3/2015 | Davenport | ......... | G06Q 10/0631 705/7.28 |
| 2015/0294048 A1 * | 10/2015 | Jones | ............... | G06Q 10/0635 703/2 |

(Continued)

*Primary Examiner* — Ramesh B Patel
(74) *Attorney, Agent, or Firm* — Eugenio J. Torres-Oyola; Victor M. Rodriguez-Reyes; Rafael Rodriguez-Muriel

(57) ABSTRACT

A method for calculating an index that provides insight as to the state and condition of industrial equipment, allowing for timely maintenance and better longevity, as well as more reliability as to its functioning.

3 Claims, 12 Drawing Sheets

(56) References Cited

U.S. PATENT DOCUMENTS

| | | | |
|---|---|---|---|
| 2016/0292802 A1* | 10/2016 | Tada | G06Q 10/0631 |
| 2017/0323403 A1* | 11/2017 | Johnson | G06Q 10/06314 |
| 2019/0156443 A1* | 5/2019 | Hall | G06Q 50/163 |
| 2019/0220828 A1* | 7/2019 | Murali | G06N 20/00 |
| 2019/0265971 A1* | 8/2019 | Behzadi | G06Q 10/06 |
| 2020/0084601 A1* | 3/2020 | Garrity | H04W 4/38 |
| 2021/0133607 A1* | 5/2021 | Stubbs | G06N 20/00 |
| 2021/0319887 A1* | 10/2021 | Derrick, Jr. | A61B 5/7275 |
| 2022/0058556 A1* | 2/2022 | Warake | G05B 19/41855 |
| 2022/0147952 A1* | 5/2022 | Michael | G06Q 10/0875 |

* cited by examiner

GT13
Last Overhaul: Jul 2015

| | 2015 | | | | | | 2016 | | | | | | | | | | | | 2017 | | Total Period (20 months) | |
|---|---|---|---|---|---|---|---|---|---|---|---|---|---|---|---|---|---|---|---|---|---|---|
| | Jul | Aug | Sep | Oct | Nov | Dec | Jan | Feb | Mar | Apr | May | Jun | Jul | Aug | Sep | Oct | Nov | Dec | Jan | Feb | | |
| PM Frequency (Monthly) | X | X | X | X | X | X | X | X | X | X | X | X | X | X | X | X | X | X | X | X | 20 | (A) |
| *Expected work orders over period | | | | | | | | | | | | | | | | | | | | | | |
| Generated Work Orders | X | X | X | X | X | X | X | X | X | X | X | X | X | X | X | X | X | | X | X | 19 | (B) |
| Completed Work Orders | X | X | | X | X | X | | X | X | X | X | X | | X | X | X | | | | X | 14 | |
| Performed On-time | X | X | | X | X | X | | | X | | | X | X | | X | | | | | X | 9 | (C) |

PM Compliance (C/A)    45%

Parent: GT12

| WO # | Equipment | Priority |
|---|---|---|
| WO-0001 | Turbine | Urgent |
| WO-0002 | Generator | 1 |
| WO-0010 | Instrumentation | 1 |
| WO-0003 | Turbine | 2 |
| WO-0004 | Fuel Pump | 2 |
| WO-0007 | Transformer bushing | 2 |
| WO-0011 | Flux Capacitor | 2 |
| WO-0005 | Fuel Valve | 3 |
| WO-0006 | Flow Meter | 3 |
| WO-0008 | Transformer Foundation | 3 |
| WO-0009 | Hose | 3 |
| Total Outstanding Work Orders (Count) | | 11 |

Priority 2/3 Work Order (Count) 8
WO Priority 73%

FIG. 6

GT13
Last Overhaul: Jul 2015

| | 2015 | | | | | | 2016 | | | | | | | | | | | | 2017 | | Total Period (20 months) | |
|---|---|---|---|---|---|---|---|---|---|---|---|---|---|---|---|---|---|---|---|---|---|---|
| | Jul | Aug | Sep | Oct | Nov | Dec | Jan | Feb | Mar | Apr | May | Jun | Jul | Aug | Sep | Oct | Nov | Dec | Jan | Feb | | |
| Closed PM Work Orders | 6 | 2 | 3 | 6 | 1 | 2 | 6 | 2 | 3 | 5 | 1 | 2 | 5 | 3 | 2 | 6 | | 2 | 5 | 2 | 56 | (A) |
| Closed Corrective Work Orders | 2 | 7 | 3 | 1 | 4 | 4 | 1 | 6 | 3 | 2 | 6 | 3 | 1 | 5 | 7 | 2 | 3 | 2 | 1 | 4 | 67 | (B) |

Work Order Split (A/B)   84%

FIG. 8

|  | Probability (time consumed) | PM Compliance | WO Split | WO Priority | Asset Condition | Critical Spares | Asset Health Index (AHI) |
|---|---|---|---|---|---|---|---|
| Score | 20% | 95% | 84% | 95% | 100% | 95% | |
| Weight | 5% | 20% | 15% | 15% | 35% | 10% | |
| Rating | 1% | 19% | 12.54% | 14.25% | 35% | 9.50% | 91% |

METHOD FOR CALCULATING A MAINTENANCE ASSET HEALTH INDEX (MAHI) FOR INDUSTRIAL EQUIPMENT

BACKGROUND OF THE INVENTION

The following application is related to the fields of maintenance for equipment used in industrial environments. Specifically, the present invention is directed to a method for calculating an index that provides insight as to the state and condition of industrial equipment, allowing for timely maintenance and better longevity, as well as more reliability as to its functioning.

The health of equipment used in industrial plants can be diagnosed or determined by several factors that have a direct impact over time, and their probability of failure based on said factors. There are several options for calculating an index for measuring the health of for plant assets (equipment). One option is dependent upon using real-time performance or operational data. In most plants, major assets such as turbines, generators, transformers generally have the capacity to transmit data from various sensors to the control system, however, the sub-systems and different elements that comprise the major system do not contain these sensors. Considering this constraint, another option to measure the health of the asset is to use information collected during the maintenance activities and to infer the risk of failure for that asset based on the maintenance history. Therefore, it would be desirable to have an equipment diagnostic tool that is able to accurately calculate the health index of the equipment while removing the need of having a technician individually inspect each subsystem of the equipment, thereby considerably (and more efficiently) reducing the time and effort it takes to obtain the health index of the equipment.

The Maintenance Asset Health Index (MAHI) object of the present disclosure uses the condition of the major asset and its components as it has been observed and recorded during maintenance interventions, the lifecycle of the asset, and to what extent the prescribed maintenance has been followed and executed. Rather than using the limited data available in the control system, the MAHI uses transactional data from the maintenance work management system to calculate and then display the MAHI indicators using a commercial off-the-shelf business intelligence software.

SUMMARY OF THE INVENTION

The subject matter relates to a method for calculating an index that provides insight as to the state and condition of industrial equipment, allowing for timely maintenance and better longevity, as well as more reliability as to its functioning.

BRIEF DESCRIPTION OF THE DRAWINGS

FIG. 2 shows the preventive maintenance compliance calculation element of the present invention.

FIG. 3 shows a preventive maintenance compliance dashboard drill-down according to the teachings of the present invention.

FIG. 6 shows the work order priority calculation element of the present invention.

FIG. 8 shows the preventive/corrective measure calculation element of the present invention.

FIG. 12 shows the calculation of a maintenance asset health index calculation according to the teachings of the present invention.

DETAILED DESCRIPTION OF THE INVENTION

The Maintenance Asset Health Index (MAHI) calculates the failure risk level of a complex asset using the asset and its component maintenance and condition history within a major maintenance cycle.

The Maintenance Asset Health Index is a function of six indicators:

$$\text{Maintenance Asset Health Index} = f\left(\text{Probability}, PM \text{ Compliance}, \text{Critical Spares}, WO \text{ Priority}, \frac{\text{Preventive}}{\text{Corrective}}, \text{Asset Condition}\right)$$

Probability

One tool to determine the probability of asset failure, within the realm of reliability engineering, is a hazard function. Hazard is the probability that an event of interest occurs in the next instant, given that is has survived so far. An example hazard function is the bathtub curve. This curve represents failures at the start of the operation, settling in, followed by an increase in failure due to aging of the equipment.

Figure 1:
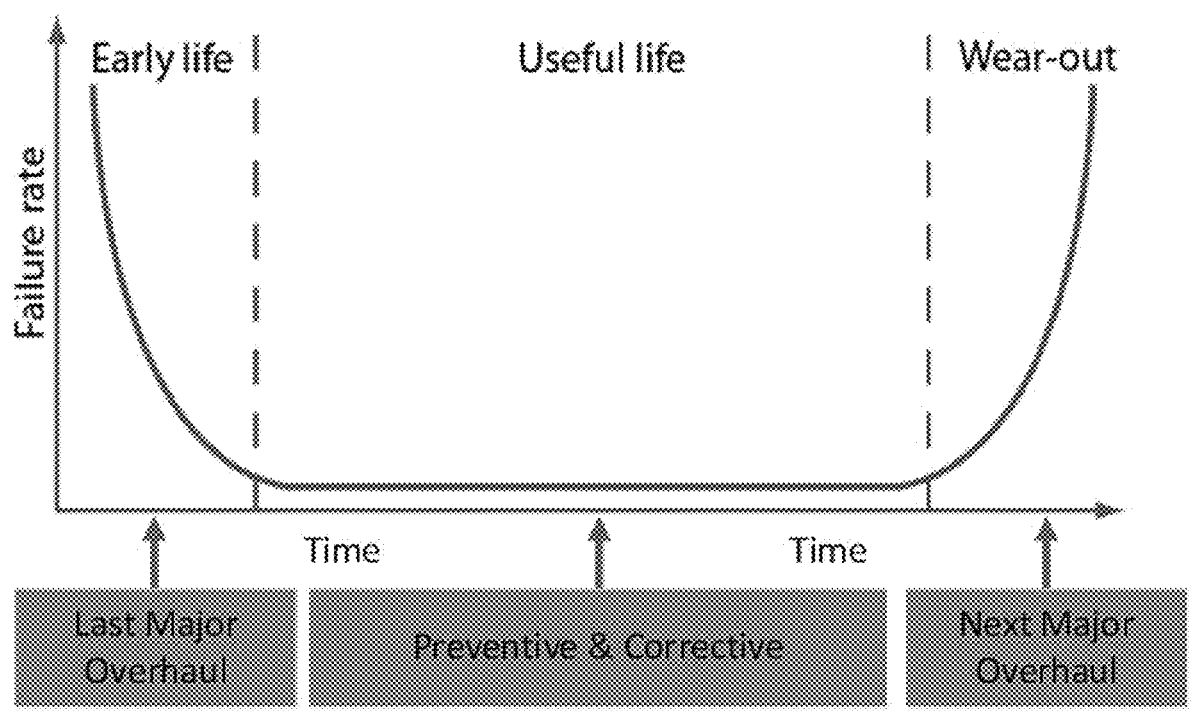
FIG. 1 shows a hazard function and asset overhaul cycle according to the teachings of the present invention.

For example, in the electrical generation industry, major assets, such as a gas turbine, should be overhauled frequently. Whereas the design life of the turbine is 30 years, in reality a turbine is inspected, and its components are replaced or refurbished every 2 or 3 years. Therefore, the life cycle is much shorter, and it basically begins at the last overhaul and ends upon the prescribed next overhaul. To simplify the analysis, the present invention provides a function of time based on the overhaul cycle for the major systems. As shown in FIG. 1, as more time elapses in this cycle, the probability of failure increases, or there is less time left to provide the proper maintenance to the asset.

Preventive Maintenance (PM) Compliance

Figure 3:
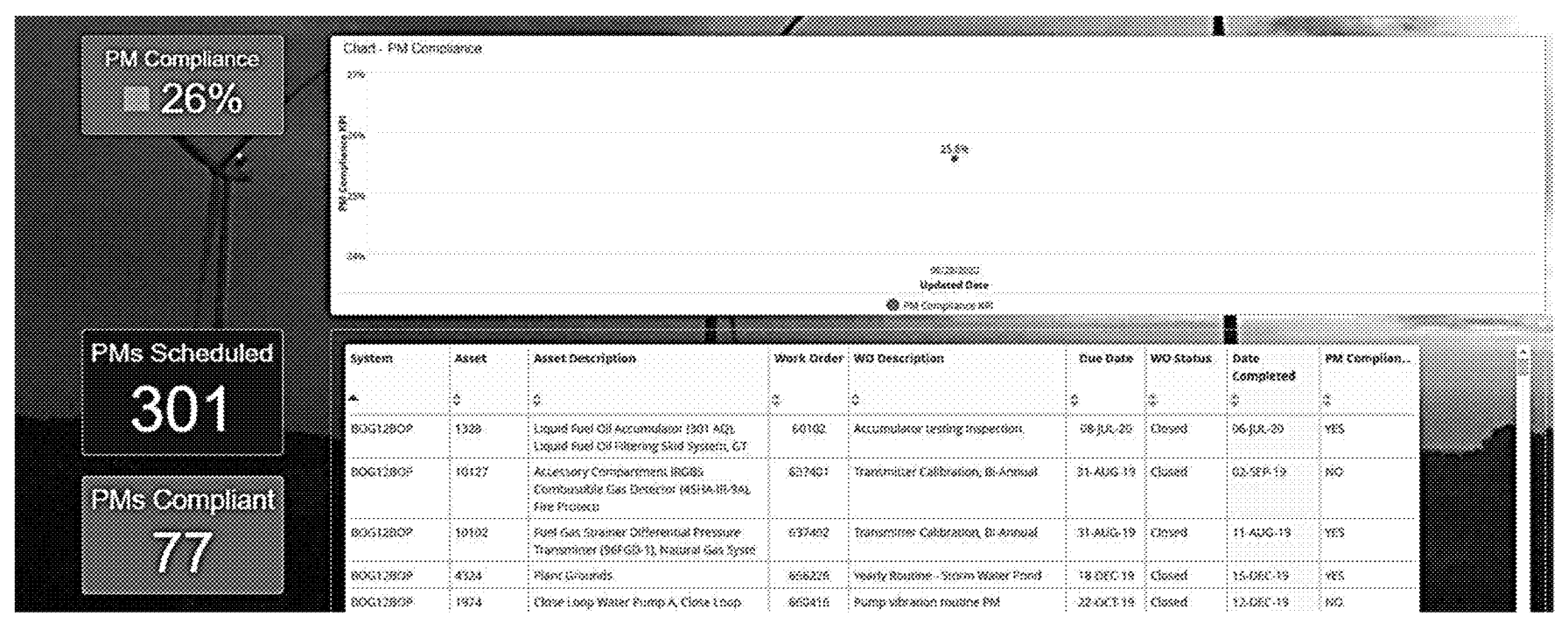

The key to maintaining an asset healthy is to prevent any major problem by proactively inspecting, changing components, lubricating, etc. PM schedules are typically recommended by the asset manufacturer and can be fine-tuned based on field experience. As shown in FIG. 2, measuring how well the schedule (or prescribed) regimen is followed will indicate if the asset is healthy or if by not following the prescribed maintenance regimen the probability of failure will increase. In the exemplary embodiment of the present invention shown in FIG. 3, PM compliance is measured by taking all the preventive work orders over the overhaul cycle, checking the scheduled end date and comparing the actual closed date.

Inventory Compliance for Critical Spares

Figure 4:
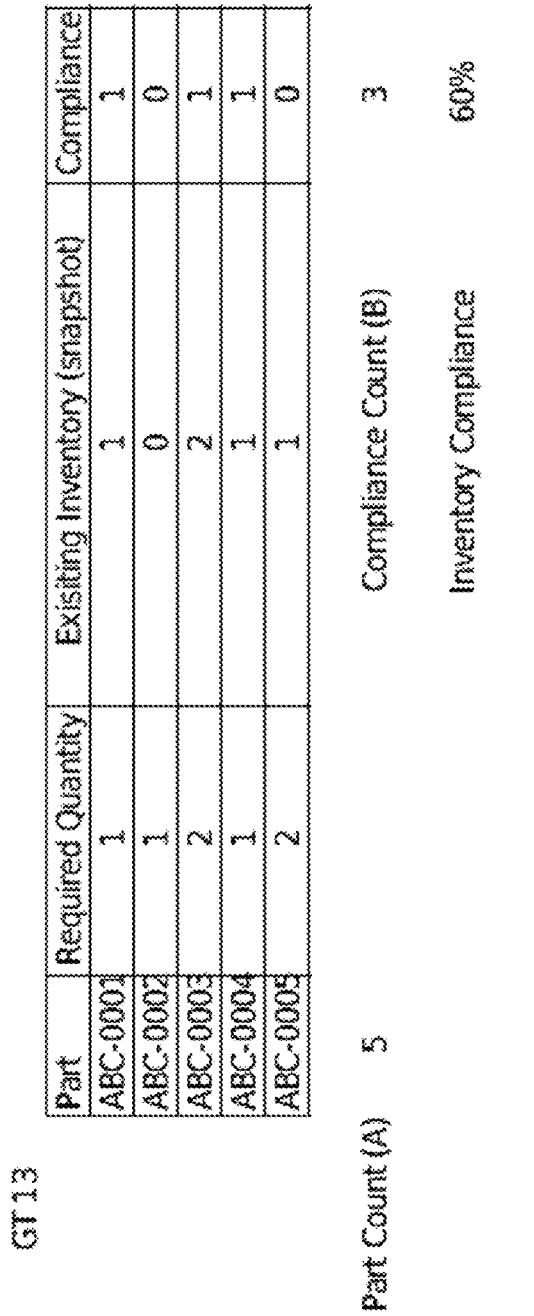
FIG. 4 shows the inventory compliance calculation element of the present invention.
Figure 5:
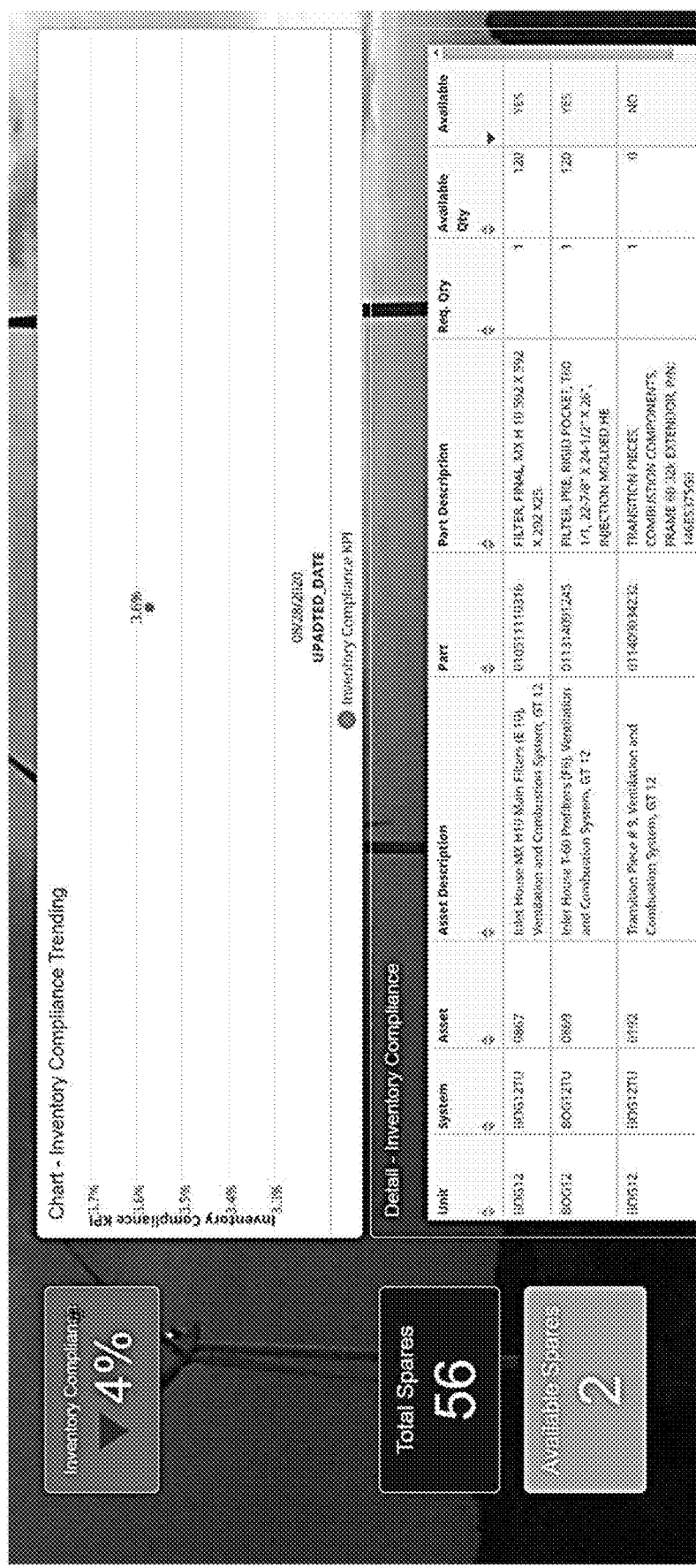
FIG. 5 shows an inventory compliance dashboard drill-down according to the teachings of the present invention.

Having the proper critical spares do not impact the health of the asset itself, but it provides insight as to the capacity of the organization to properly react when a failure occurs and the readiness to complete a preventive maintenance work order having the right spares and the right quantity of them. As shown in FIG. 4, this metric is calculated by looking at the existing inventory/stock to determine if there is inventory (hit/miss) and if the quantity meets the requirements. For example, in the exemplary embodiment of the present invention shown in FIG. 5, when a user drilldowns to the Inventory Compliance key performance indicator (KPI), a dashboard displays the detail of the Unit-System-Asset-Part with the required and available quantities and whether the requirement is being met or not.

Work Order Priority

Figure 7:
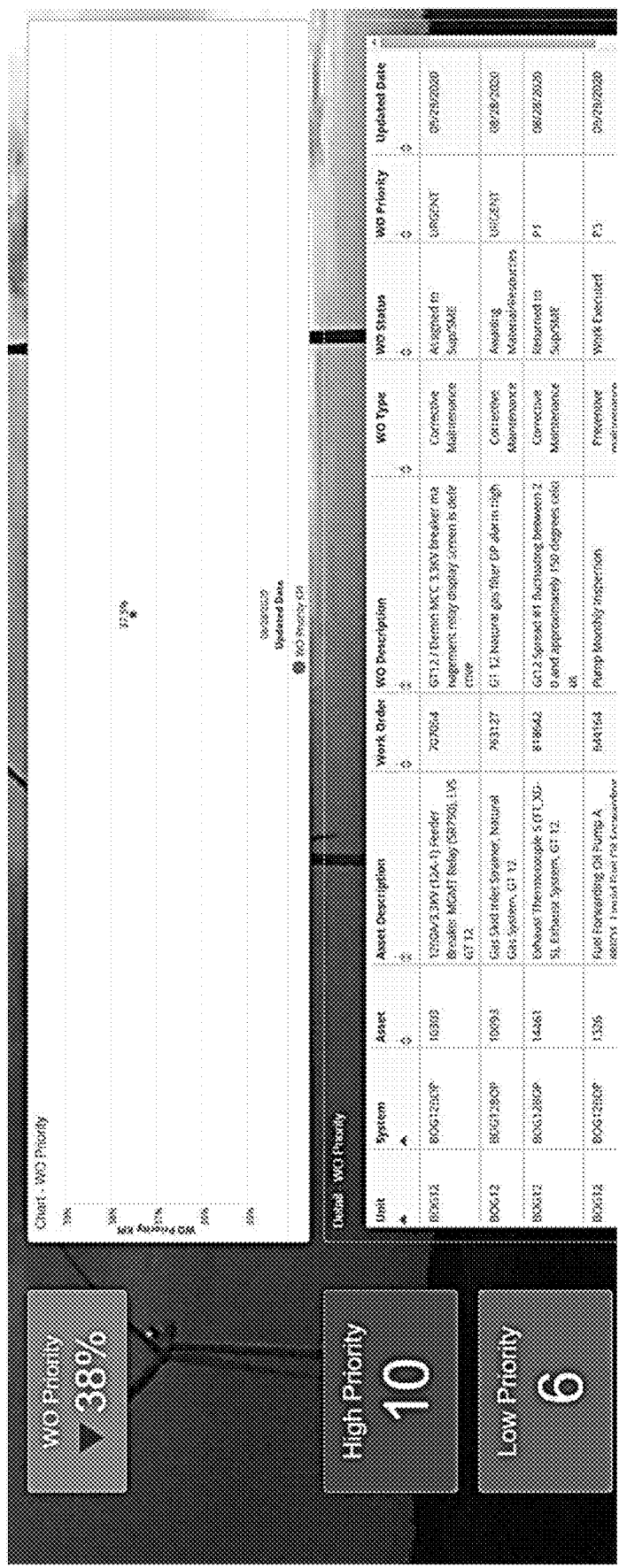
FIG. 7 shows a work order priority dashboard drill-down according to the teachings of the present invention.

Further embodiments of the present invention comprise calculating the priority of maintenance work orders using the age of the work order (elapsed time since creation of work order), equipment (asset) Criticality and Work Order impact. The priority, which is defined as Urgent, Priority 1, 2 and 3, is assigned based on the calculated priority (which is a numerical value). When a user looks at all the open work orders for a system, including all its children (i.e., subsystems), there should mostly be work orders with lesser priority (Priority 2 and 3). In other words, if the maintenance department is on top of the most critical jobs, better asset health is expected. FIG. 6 provides an example of how this factor is calculated. The drilldown function, shown in FIG. 7, displays the detailed information for this KPI in the form of a list of all the work order considered for the period with their corresponding priority.

Preventive/Corrective (Work Order Split)

Figure 9:
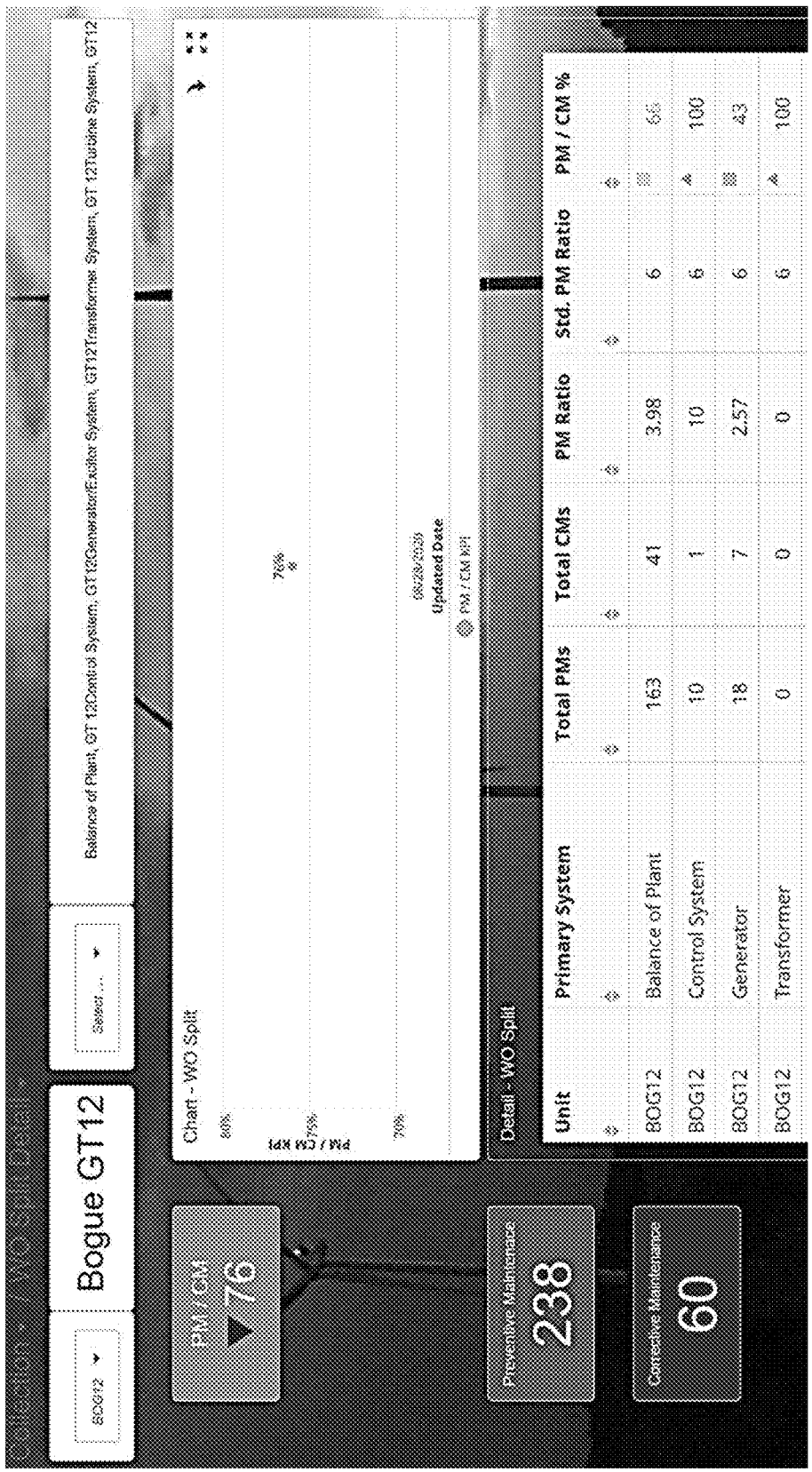
FIG. 9 shows a preventive/corrective measure dashboard drill-down according to the teachings of the present invention.

Intuition, best practices, or common sense tells us that an effective maintenance program based on preventive work will result in less failures, and therefore in less corrective work. As shown in FIG. 8, this factor is calculated counting all the preventive and repair work orders for a system, including all its children (i.e., subsystems), over the overhaul cycle, and calculating the ratio of preventive measures versus repairs as a percentage. FIG. 9 shows drilldown function, which displays the detail for each primary system for each unit with the total number of Preventive Maintenance (PM) work orders, Corrective Maintenance (CM) and the ratio.

Asset Condition

When work orders are closed in an application used for work order management, such as Infor EAM, the maintenance technician must evaluate, based on observations or the result of predictive tests (such as oil tests), the condition of the asset based on a scale from 1 thru 5 (1 is the highest, best score, 5 means unserviceable). The present invention maps the condition score to a percentage. A condition score of 1 represents 100% asset condition, 2=80%, 3-60%, 4=40% and 5=20%. The present invention further looks at the asset's children's (i.e., subsystems) condition and rolls-up the condition up to its parent, such that the most critical sub-system/component with the worst condition determines the condition of the parent asset.

Figure 10:
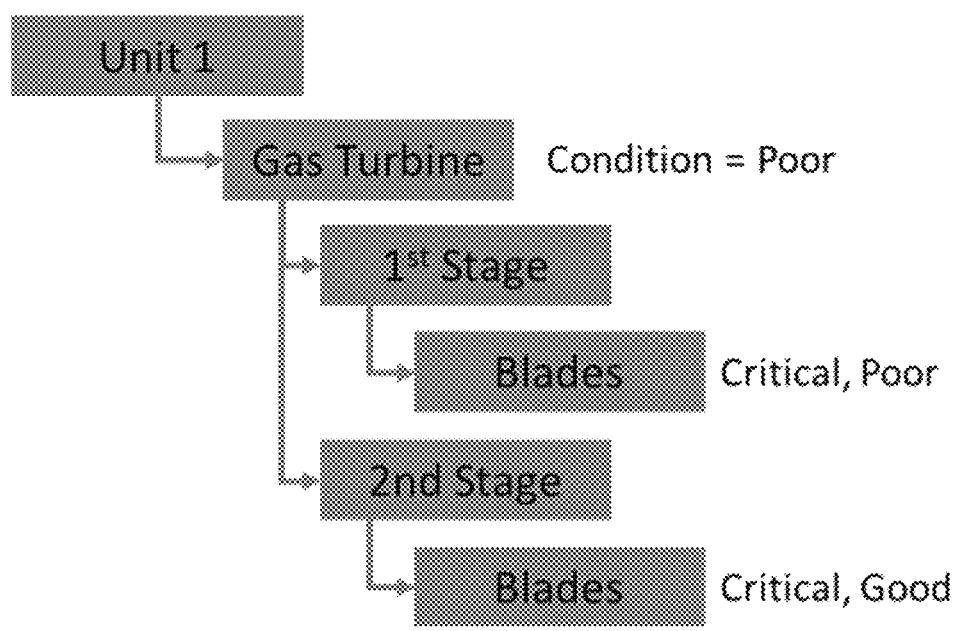
FIG. 10 shows the asset condition and criticality calculation element of the present invention.

FIG. 10 illustrates the concept for a gas turbine comprised of only 2 stages. Each stage has a set of blades and each set is an equally critical component. However, the condition, as per the maintenance evaluation, if the blade set for the first stage is determined to be poor. This determines the condition of the gas turbine to be poor.

Figure 11:
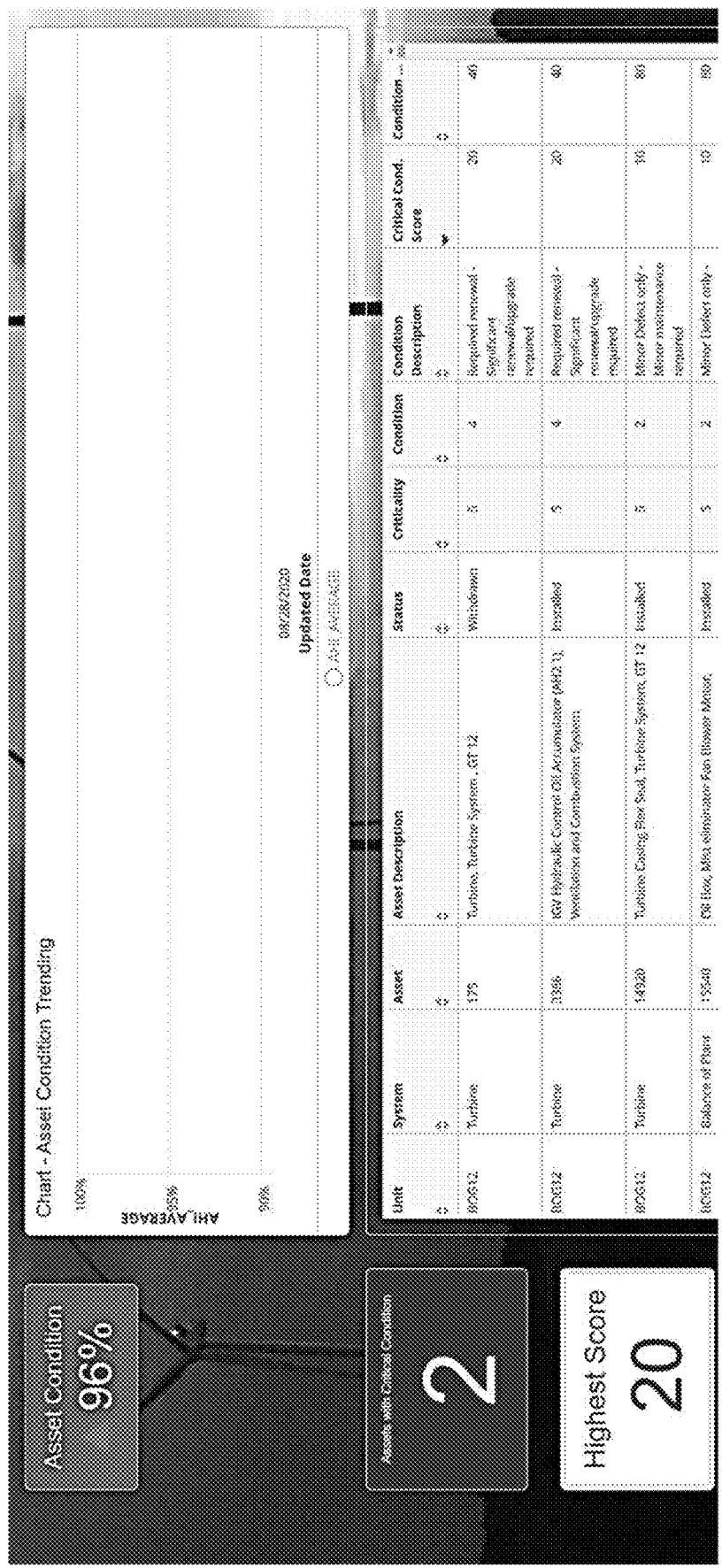
FIG. 11 shows an asset condition and criticality dashboard drill-down according to the teachings of the present invention.

FIG. 11 shows a drill-down on an asset condition KPI, where the dashboard displays a list of all the components with their corresponding criticality and condition in descending order thus providing visibility of the critical components that need attention.

Calculation of the Maintenance Asset Health Index

The last step in the process to calculate the MAHI is to assign a weight to each one of the discussed individual factors. The total sum of the weights must equal 100%. The weight distribution can be adjusted for each major system as required. FIG. 12 shows an example of how this calculation is made.

In order to calculate the MAHI for a complex system, according to the principles of the disclosed invention, the following steps must be followed:

1. Determine the date when the last major maintenance event took place, when the next major maintenance event is due and the number of days between these dates. This is the major maintenance cycle duration measured in days.
2. Determine the current date and determine the number of elapsed days between the last major maintenance and the current date. Calculate the percentage of elapsed time by dividing the number of elapsed days by the total number of days in the major maintenance cycle determined in step #1.
3. Identify all the components and sub-systems associated with the main (complex) asset or industrial equipment.
4. Identify all the work orders completed during the major maintenance cycle.
5. Calculate the % of preventive maintenance work orders that were completed on time versus the total number of preventive work orders generated during the major maintenance cycle. This is the PM Compliance factor.
6. Calculate the % of preventive work orders closed versus the total number of work orders (includes preventive as well as corrective work orders) completed during the major maintenance cycle. This is the Work Order Split Factor.
7. Calculate the % of Urgent and Priority 1 work orders versus the total number of work orders (includes Urgent, Priority 1, 2 and 3 work orders) completed during the major maintenance cycle. This is the Work Order Priority Factor.
8. Multiply the current condition score (numeric scale from 1 to 6) of each component and sub-system by its criticality (numeric scale from 1 to 6). Rank the results in descending order and select the top result. This is the Critical Condition Score. Calculate the Critical Condition Index by taking the highest asset criticality and multiplying it by 6. Divide the Critical Condition Score by the Critical Condition Index. Subtract 1 minus the result of the previous calculation and multiply it by 100. This is the Asset Condition Factor.
9. List all the part codes listed as a critical part for all the complex asset and its components and sub-systems. Determine the required quantity for each part/asset combination. Now search for each part in the inventory/stock level records and determine if the required quantities are met by the existing stock level; this should be considered a "Hit" or numerical value of 1. If the quantity requirement is not met, this is considered a "Miss" or numerical value of 0. Count the number of "Hits" (1's) and total number of Asset/Part combinations. Divide the total number of 1's by the total number of Asset/Part combinations. This is the Critical Spares Factor.

10. Finally, take each one of the factors, multiply each factor by its assigned weight and add the results. The resulting number is the Maintenance Asset Health index for the Main (Complex) asset.

It will be apparent for persons skilled in the art that other variations of these embodiments could be constructed according to the state of the art and the teachings in this disclosure. The disclosure is not limited to the precise configuration described above. While the disclosure has been described as having a preferred design, it is understood that many changes, modifications, variations and other uses and applications of the subject invention will, however, become apparent to those skilled in the art without materially departing from the novel teachings and advantages of this disclosure after considering this specification together with the accompanying drawings.

Accordingly, all such changes, modifications, variations and other uses and applications which do not depart from the spirit and scope of the invention are deemed to be covered by this invention.

What is claimed is:

1. A method for obtaining a maintenance health index that is representative of the state and condition of a particular industrial equipment, said method being performed in a computer having a non-transitory memory that comprises program instructions stored thereon that, when executed by a processor, cause the computer to perform the following step:
   determine the duration of a major maintenance cycle for an industrial equipment by:
      identifying the date in which the last major maintenance event of the industrial equipment took place;
      identifying when the next major maintenance event is due for the industrial equipment;
      calculating the number of days between the date in which the last major maintenance of the industrial equipment took place and the due date for the next major maintenance event of the industrial equipment;
   determine the current date and the number of days elapsed between the last major maintenance event and the current date;
   calculate a percentage of elapsed time by dividing the number of elapsed days by the total number of days in the major maintenance event cycle;
   identify all components and sub-systems associated with the industrial equipment;
   identify all work orders completed during the major maintenance cycle;
   determine a preventive maintenance factor compliance for the industrial equipment by:
      calculating the percentage of preventive maintenance work orders that were completed on time versus the total number of preventive work orders generated during the major maintenance cycle;
   determine a work order split factor for the industrial equipment by:
      calculating the percentage of preventive work orders closed versus the total number of work orders completed during the major maintenance cycle;
   determine a work order priority factor for the industrial equipment by:
      calculating the percentage of work orders identified as "urgent" or "priority 1" versus the total number of work orders completed during the major maintenance cycle;
   determine a critical condition score by multiplying a current condition score of each component and sub-system by its criticality, and by ranking the results in descending order and selecting the top result;
   determine a critical condition index by taking the highest asset criticality and multiplying it by six (6.0);
   determine an asset condition factor by:
      dividing the critical condition score by the critical condition index; and
      subtracting one (1.0) minus the result or quotient obtained from the previous division and multiplying it by one hundred (100.0);
   determine a critical spares factor by:
      listing all the parts codes listed as a critical part for all the industrial equipment and its components and sub-systems;
      determining the required quantity for each part or equipment combination;
      searching for each part in an inventory/stock level record and determining if the required quantities are met by the existing stock level;
      wherein if the required quantities are met by the existing stock level, this will be considered a "Hit" and assigned a numerical value of 1;
      wherein if the quantity requirement is not met, this is considered a "Miss" and assigned a numerical value of 0;
      counting the number of "Hits" and total number of equipment/part combinations; and
      dividing the total number of "Hits" by the total number of equipment/part combinations;
   determine a maintenance asset health index for the equipment by taking each one of the factors, multiply each factor by its assigned weight and adding the results; and
   display the maintenance asset health index on a monitor.

2. The method of claim 1, wherein the total number of work order completed during the major maintenance cycle includes work orders identified as "urgent" or "priority 1, 2 or 3".

3. The method of claim 1, wherein the current condition score of each component and sub-system is measured by a numeric scale from 1 to 6.

* * * * *